United States Patent Office 3,314,994
Patented Apr. 18, 1967

3,314,994
CONCENTRATED SOLUTIONS OF AURAMINE DYES
Fritz Schubert and Eberhard Luecke, Ludwigshafen (Rhine), Germany, assignors to Badische Anilin- & Soda-Fabrik Aktiengesellschaft, Ludwigshafen (Rhine), Germany
No Drawing. Filed Dec. 3, 1963, Ser. No. 327,834
Claims priority, application Germany, Dec. 7, 1962, B 69,895; Dec. 18, 1962, B 70,021
6 Claims. (Cl. 260—566)

This invention relates to highly concentrated solutions of salts of auramine with sulfuric acid or its acid water-soluble derivatives.

Auramine dyes are used on a large scale in the form of their aqueous solutions in the paper industry. In general the dyes are used in finely ground form for the preparation of the said solutions. The use of powdered dyes however has considerable disadvantages. Thus for example it is difficult to dissolve the dyes if the finely ground dry powder has partly or completely agglomerated into lumps by the action of moisture or heat owing to unsuitable storage. Moreover the weighing out, transfer or feeding of powdered water-soluble dyes having very high tinctorial strength is accompanied by unpleasant dust formation. When the dyes are dissolved and when the solutions are stirred, particularly during incorporation into the paper pulp, there is frequently marked froth formation leading to frothing over of the solutions and consequent contamination and waste.

To avoid dusting of the finely ground dyes and frothing during the preparation or stirring of solutions it has been proposed to add certain substances. Many wetting agents have also been recommended for promoting rapid and complete solution of dye powders. These additives are without exception auxiliaries which lessen the said disadvantages without completely obviating them.

The disadvantages of finely ground auramines in industrial use may be avoided by the use of highly concentrated stock solutions supplied by the dye manufacturer. Highly concentrated aqueous solutions could however not be prepared hitherto.

Auramines have hitherto usually been prepared in the form of their chlorides. These have relatively poor solubility in water (only about 1%) and even these solutions deposit dye upon prolonged standing. Furthermore the auramines readily hydrolyze in Michler's ketone upon prolonged heating in aqueous solution or in an acid medium.

It is the object of the present invention to provide stable concentrated solutions of auramine dyes which do not have the said disadvantages.

This object is achieved by the concentrated solutions according to the invention which contain salts of bases of auramines with sulfuric acid or its acid, water-soluble derivatives in any water-miscible solvent which is liquid at room temperature and has a boiling point (at atmospheric pressure) of more than 80° C. or preferably of more than 100° C.

Suitable auramine dyes are for example salts of Auramine O Base (Colour Index, 2nd edition, No. 41,000B) or Auramine G Base (Colour Index, No. 41,005).

Examples of water-soluble solvents having a boiling point of more than 80° C., particularly of more than 100° C., which are liquid at room temperature are monohydric or polyhydric alcohols, such as ethylene glycol, butanediol, diethylene glycol, thiodiglycol, triethylene glycol, dipropylene glycol, their ethers, such as diethylene glycol methyl ether or diethylene glycol butyl ether, water-soluble polyethers, such as the polymerization products of alkylene oxides whose terminal groups may be esterified or etherified, lactones, such as butyrolactone, amides, such as formamide, dimethylformamide or N-methylpyrrolidone, and also acetonitrile, pyridine and dimethyl sulfoxide or mixtures of the said solvents. These solvents need not be anhydrous, but may contain water.

Among the said solvents, formamide is particularly suitable for the preparation of stable solutions. A solution of Auramine O sulfate in formamide is particularly advantageous industrially.

The concentrated solutions contain the salts of auramine bases with sulfuric acid or its derivatives to the extent of about 20 to about 60%, preferably 30 to 50% by weight with reference to the weight of the solution.

The solutions may be more dilute, but such dilution is not advantageous owing to increased costs for solvent and transportation.

The solutions according to this invention may also contain other solvents which are miscible with water and which boil at less than 80° C.

Examples of suitable acid, water-soluble derivatives of sulfuric acid are aminosulfonic acids, chlorosulfonic acid or the methyl or ethyl esters of sulfuric acid. For the production of sulfates it is preferable to use the acid, water-soluble derivatives of sulfuric acid, such as sodium, potassium or ammonium bisulfate.

The procedure for the preparation of the solutions according to this invention may be for example that the auramine base is dissolved in a non-polar solvent which is not miscible with the water-miscible solvent, such as chloroform, ethylene chloride, trichloroethylene, dichlorobutane, benzene, toluene or xylene, and that the stoichiometric amount of sulfuric acid or an acid salt or acid derivative thereof is added to the solution obtained. A deficiency of the acid component, for example a deficiency of 10 to 30%, is however often sufficient. Sulfuric acid monohydrate or an equivalent amount of oleum may also be used instead of sulfuric acid. The reaction is over within a short time. The solvent miscible with water is then added and the dye dissolved therein. The dye solution is then separated. In some cases it is advantageous to add to the mixture basic substances, such as urea, bis-4,4'-dimethylaminodiphenylmethane, ethanolamine or diethanolamine, in order to achieve more efficient separation of the layers. If desired, non-polar solvent still contained in the dye solution, such as chloroform or benzene, may readily be removed by treatment under subatmospheric pressure or by blowing in air or nitrogen.

The separated non-polar solvent may be purified by distillation with or without steam. The residue remaining may readily be converted into Michler's ketone.

The solutions according to this invention may also be prepared by reacting the auramine bases with sulfuric acid or its derivatives in organic solvents which are miscible with water. For this purpose, for example, the auramine base is suspended in a solvent or mixture of solvents and a solution of sulfuric acid or derivative thereof in the same or another solvent is allowed to flow into this suspension slowly. After stirring the reaction mixture for some time, undissolved constituents are filtered off and a concentrated auramine solution is obtained.

It is also possible for example to dissolve the sulfuric acid in a solvent such as formamide and to add the mixture to the dissolved auramine base.

Another method of making the solutions consists in dissolving auramine sulfate, which may also be prepared in substance by reacting auramine bases with a water-soluble hydrogen sulfate, in one of the said solvents.

The following examples will further illustrate this invention but the invention is not limited to these examples. The parts specified in the examples are parts by weight.

*Example 1*

268 parts of Auramine O Base (Colour Index No. 41,000B) is dissolved in 1340 parts of chloroform at room temperature. A solution of 44 parts of concentrated sulfuric acid in 565 parts of formamide is allowed to flow into the filtered solution while stirring in the course of fifteen minutes, the temperature rising from 30° to 37° C. 5 parts of bis-4,4'-di-methylaminodiphenylmethane is then added in small portions and the mixture is stirred for twenty minutes. The chloroform is separated and then the chloroform still contained in the dye solution is distilled off under subatmospheric pressure. 773 parts of an auramine solution is obtained which contains about 36% by weight of dye. This auramine solution may be diluted in all proportions with water and used for the production of aqueous dye liquors.

The chloroform solution separated may be distilled and the residue may be hydrolyzed without difficulty to Michler's ketone.

Example 2

134 parts of Auramine O Base is dissolved in 650 parts of toluene. A solution of 22 parts of concentrated sulfuric acid in 160 parts of formamide is allowed to flow into the filtered solution in the course of twenty minutes while stirring. The temperature rises from 32° to 40° C. The whole is further stirred for about twenty minutes and then the toluene is separated off. Toluene residues still contained in the dye solution are removed by heating under subatmospheric pressure. 300 parts of a brown dye solution is obtained which contains 49.5% of dye. The concentrated solution may readily be diluted with water.

The toluene may for the most part be recovered from the separated toluene solution by distillation or by expelling it with steam. The residue may then readily be hydrolyzed to Michler's ketone.

Trichloroethylene may be used instead of toluene. The sulfuric acid may be replaced by an equivalent amount of 26% oleum.

Example 3

134 parts of Auramine O Base is dissolved in 82 parts of propanol at 50° to 55° C. 49 parts of concentrated sulfuric acid is allowed to flow in within half an hour at the same temperature. Shortly after the end of the addition, an orange crystalline product is precipitated. The whole is stirred for about another twenty minutes and the dye then suction filtered. The hydrogen sulfate is washed twice with acetone and dried under subatmospheric pressure. The yield is 141 parts of dye (melting point 216° to 221° C.).

The dye is dissolved in dipropylene glycol, formamide or dimethylformamide in the ratio 1:1. A 50% dye solution is thus obtained which may be diluted with water to a clear solution.

Example 4

134 parts of Auramine O Base is suspended in 280 parts of formamide by stirring. 57 parts of sodium bisulfate is added to the suspension. The temperature rises from 24° to 46° C. The mixture is stirred overnight at room temperature, another 6 parts of sodium bisulfate is added, stirring continued for some time and the whole then filtered. 359 parts of a dark auramine solution is thus obtained having a dye content of 40.0%; it may be diluted to any desired extent to form a dye liquor.

Equivalent amounts of potassium bisulfate or ammonium bisulfate may be used instead of sodium bisulfate.

Example 5

134 parts of Auramine O Base is suspended in 225 parts of formamide in a ball mill. A solution of 24.5 parts of concentrated sulfuric acid in 55 parts of formamide is allowed to flow slowly into the mixture while stirring. The mixture is then treated for 4½ hours in a ball mill and the brown auramine solution formed is then filtered free from undissolved constituents. 367 parts of a dark auramine solution is obtained which contains 35.5% by weight of dye. The solution is capable of unlimited dilution with water.

Sulfuric acid monohydrate may be used instead of concentrated sulfuric acid.

The filter residue may easily be hydrolyzed to Michler's ketone.

Example 6

134 parts of Auramine O Base is dissolved in 630 parts of benzene while heating. After filtration, a mixture of 63 parts of ethylsulfuric acid and 225 parts of formamide is allowed to flow into this solution within twenty minutes while stirring. After further stirring for a short time, the two layers are separated from each other. Small amounts of benzene are removed under subatmospheric pressure from the formamide layer. 316 parts of a dark brown solution having a dye content of about 31% is obtained.

Methylsulfuric acid may be used instead of ethylsulfuric acid with equal success.

Example 7

402 parts of Auramine O Base is dissolved in 1900 parts of chloroform and while stirring at room temperature 171 parts of sodium hydrogen sulfate is introduced. A rise in temperature from 24° to 36° C. takes place. The reaction mixture is stirred for another twenty minutes and then filtered. The filtrate is allowed to flow into 2700 parts of benzene while cooling, the dye thus being deposited in crystalline form. The residue is suction filtered after having been stirred for a short time. 476 parts of a yellow auramine dye is obtained. When Auramine G Base is used instead of Auramine O Base, a dye with similar properties is obtained.

A concentrated, for example 40%, stable solution can be prepared by dissolving the dyes thus obtained in formamide.

We claim:

1. A concentrated solution containing from about 20 to about 60% by weight of a dye of the formula $A^{\oplus}X^{\ominus}$ where $A^{\oplus}$ represents the cation of an auramine selected from the class consisting of Auramine O and Auramine G and $X^{\ominus}$ represents an anion selected from the class consisting of $SO_4^{\ominus\ominus}$, $SO_4H^{\ominus}$, $NH_2SO_3^{\ominus}$, $ClSO_3^{\ominus}$, $CH_3OSO_3^{\ominus}$ and $C_2H_5\text{-}OSO_3^{\ominus}$, in an inert organic solvent which is miscible with water in all proportions, which is liquid at normal temperature and which has a boiling point above 80° C.

2. The concentrated solution as claimed in claim 1 in which the concentration of said dye is about 30 to 50% by weight.

3. The concentrated solution as claimed in claim 1 which has been diluted with water.

4. A concentrated solution containing from about 20 to about 60% by weight of a dye of the formula $A^{\oplus}X^{\ominus}$ where $A^{\oplus}$ represents the cation of an auramine selected from the class consisting of Auramine O and Auramine G and $X^{\ominus}$ represents an anion selected from the class consisting of $SO_4^{\ominus\ominus}$, $SO_4H^{\ominus}$, $NH_2SO_3^{\ominus}$, $ClSO_3^{\ominus}$, $CH_3OSO_3^{\ominus}$ and $C_2H_5\text{-}OSO_3^{\ominus}$, in a solvent selected from the class consisting of glycol, butanediol, diethyleneglycol, diethyleneglycolmethyl ether, diethyleneglycolbutyl ether, butyrolactone, formamide, dimethylformamide, N-methylpyrrolidone, acetonitrile, pyridine and dimethylsulfoxide.

5. A concentrated solution containing from about 20 to about 60% by weight of Auramine O sulfate in formamide.

6. A concentrated solution containing from about 20 to about 60% by weight of Auramine O hydrogen sulfate in formamide.

References Cited by the Examiner

UNITED STATES PATENTS 3,209,027   9/1965   Grosklos _____ 260—566

CHARLES B. PARKER, *Primary Examiner.*

FLOYD D. HIGEL, *Assistant Examiner.*